United States Patent [19]
McInerney

[11] 4,010,613
[45] Mar. 8, 1977

[54] TURBOCHARGED ENGINE AFTER COOLING SYSTEM AND METHOD

[75] Inventor: Charles E. McInerney, Torrance, Calif.

[73] Assignee: The Garrett Corporation, Los Angeles, Calif.

[22] Filed: June 2, 1975

[21] Appl. No.: 583,130

Related U.S. Application Data

[62] Division of Ser. No. 422,108, Dec. 6, 1973, abandoned.

[52] U.S. Cl. ................................ 60/599; 60/604; 60/614; 62/323
[51] Int. Cl.² ........................................ F02B 29/04
[58] Field of Search .................. 60/599, 604, 614; 62/323

[56] References Cited
UNITED STATES PATENTS 2,877,622 3/1959 Antonissen ........................ 60/599
3,257,797 6/1966 Lieberherr ........................ 60/599
3,355,877 12/1967 Chaffiotte ........................ 60/599

*Primary Examiner*—Ronald H. Lazarus
*Attorney, Agent, or Firm*—Albert J. Miller; Jack D. Puffer

[57] ABSTRACT

Turbocharged engine air supply cooling arrangement and method that utilizes an air-to-air heat exchanger provided with a fan to circulate ambient air about the heat exchanger to cool turbocharger compressor discharge air. The air is cooled to near, but above, the temperature of the ambient air as it passes through the heat exchanger. The air is then conveyed through a turbine which is mechanically connected to rotate the fan in response to the energy of expansion of the air. As the air expands through the turbine, it is cooled to a lower temperature, even below that of the ambient air before delivery to the engine.

5 Claims, 3 Drawing Figures

TURBOCHARGED ENGINE AFTER COOLING SYSTEM AND METHOD

This is a division of application Ser. No. 422,108 filed Dec. 6, 1973, and now abandoned.

BACKGROUND OF THE INVENTION

Heretofore, exhaust pollution control devices for internal combustion engines were provided which controlled emissions of carbon monoxide and hydrocarbons, but not oxides of nitrogen. Control of carbon monoxide and hydrocarbons was accomplished by increasing the operating temperature of the engines, which allowed more complete combustion of fuel. However, increasing the combustion temperature of internal combustion engines increases the production of nitrogen oxides in the exhaust. As a result, the engines are capable of emitting low concentrations of carbon monoxide and hydrocarbons in the exhaust, but high concentrations of nitrogen oxide are still present.

Examples of prior art internal combustion engines are U.S. Pat. No. 3,141,293 to Crooks; U.S. Pat. No. 2,877,622 to Antonissen; U.S. Pat. No. 2,703,560 to Lieberherr; U.S. Pat. No. 2,703,561 to Froehlich; U.S. Pat. No. 2,766,744 to Steiger; U.S. Pat. No. 2,645,409 to Lawler; U.S. Pat. No. 3,483,854 to Foran et al; U.S. Pat. No. 2,994,187 to Kelgard; U.S. Pat. No. 2,571,256 to King; and U.S. Pat. No. 2,678,532 to Miller.

SUMMARY OF THE INVENTION

Apparatus and method for cooling inlet air to an internal combustion engined involving cooling the inlet air, expanding the inlet air, and using the energy of expansion of effect further cooling of the inlet air.

The present invention eliminates the disadvantages of prior exhaust pollution control devices by cooling inlet air to even below ambient temperature so that the engine combustion temperature is lowered thus minimizing production of oxides of nitrogen in the engine exhaust.

DETAILED DESCRIPTION OF THE PREFERRED EMBODIMENTS

Figure 1:
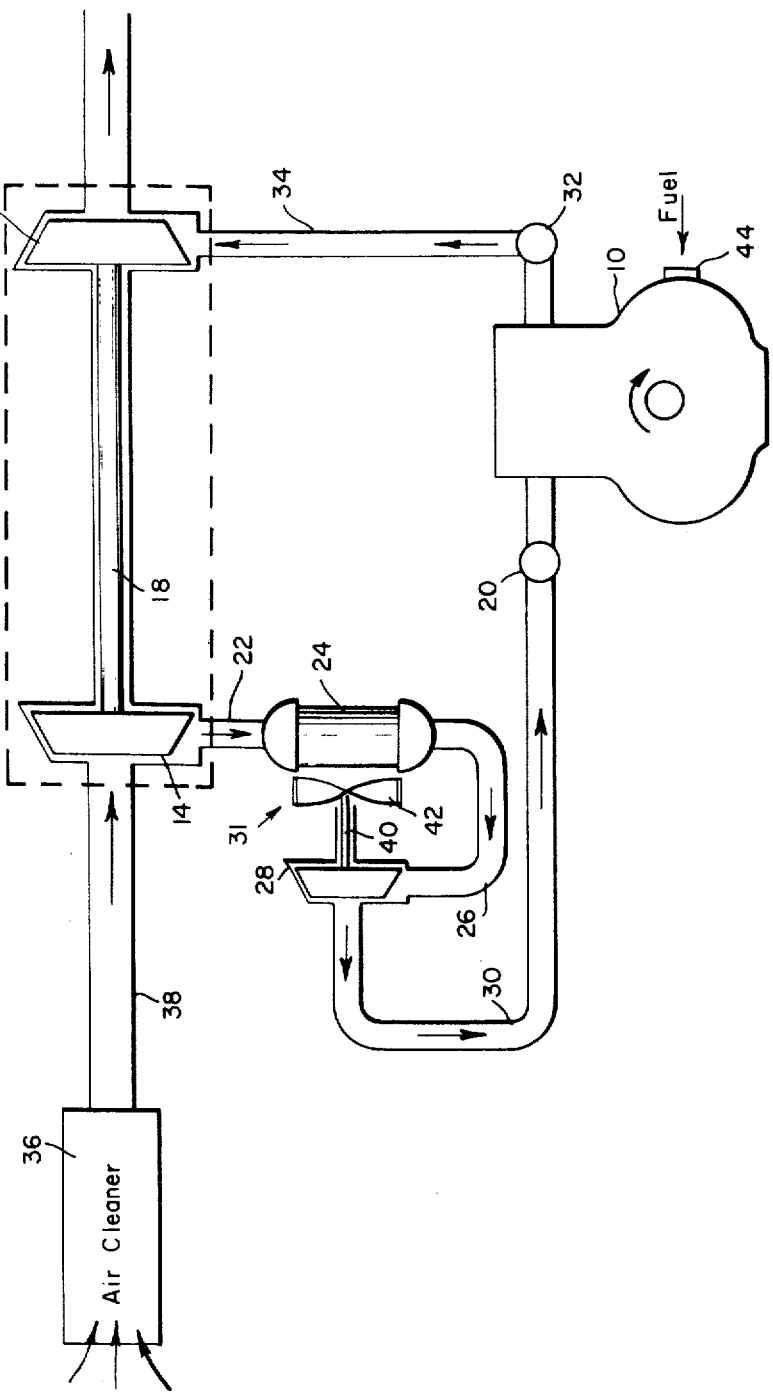
FIG. 1 is a schematic showing of one embodiment of the present invention utilized with a turbocharged engine.

Reference is now made to FIG. 1 wherein there is shown one embodiment of the cooling system of the present invention for an internal combustion engine 10. Engine 10 has a turbocharger 12 consisting of a compressor 14 driven by a turbine 16 through shaft 18. Engine 10 has been illustrated as being provided with turbocharger 12, but it will be appreciated that the engine could be one that is equipped with any conventional supercharger apparatus. Compressor 14 supplies air to an engine inlet manifold 20 through line 22, the heat exchanger 24, line 26, and turbo-expander 28 of aftercooler 31, and line 30. Turbine 16 is driven by exhaust gases from an exhaust manifold 32 and line 34. Engine 10 may be of the spark ignition or diesel type. Compressor 14 can be of the centrifugal type for compressing ambient atmospheric air supplied through an air cleaner 36 and line 38. The heat exchanger 24 is preferably of the air-to-air type. Turbo-expander 28 can be a full flow turbine which is connected through shaft 40 to fan 42. Fuel is supplied to the engine 10 by any conventional fuel intake apparatus 44.

In operation, in a device constructed in accordance with the embodiment of FIG. 1, ambient atmospheric inlet air passes through air cleaner 36 at, say, a temperature of 85° F and pressure of 28.4 inches HgA. Compressor 14 compresses the air to about 66.8 inches HgA. The temperature of the compressed air is considerable and would be approximately at 305° F. Turbine 16, which drives compressor 14, receives exhaust gases from engine exhaust manifold 32 at 940° F and a pressure of 61.6 inches HgA, for example. In passing through heat exchanger 24 the inlet air is cooled down to a temperature of about 102° F which is near, but above, the temperature of the ambient atmosphere, and a pressure of 65.8 inches HgA. In turbine 28 the temperature drops to 80° F, which is below ambient atmosphere temperature, and a pressure of 54.9 inches HgA. Expansion of air through turbine 28 creates sufficient energy to rotate fan 42 which circulates the ambient atmospheric air about heat exchanger 24 to further cool inlet air passing therethrough to near ambient atmospheric temperature.

Figure 2:
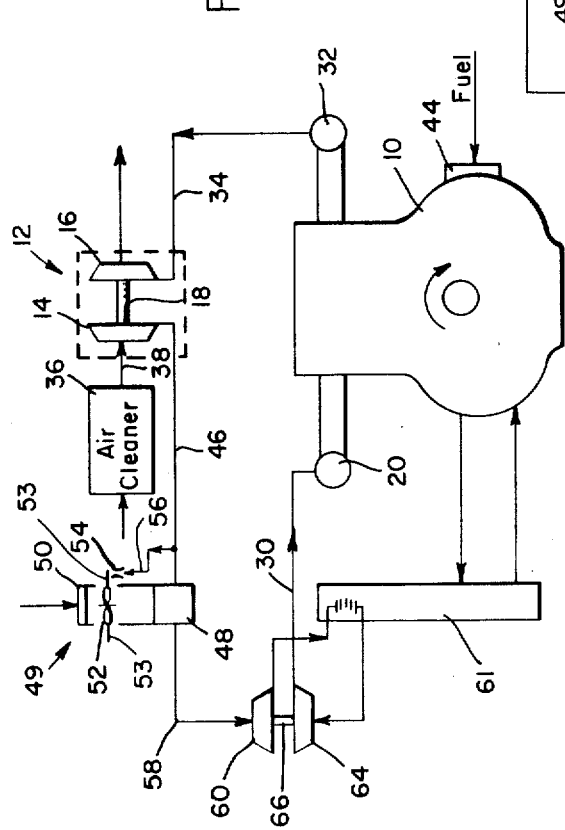
FIG. 2 is a schematic showing of another embodiment of the invention.

Referring now to FIG. 2, wherein another embodiment of the present invention is revealed. The embodiment, as illustrated in FIG. 2, utilizes parts similar to those used in the embodiment of FIG. 1, and like numerals serve to designate like parts. In the embodiment of FIG. 2 a portion of the inlet air compressed by compressor 14 is conveyed through line 46 and air-to-air heat exchanger 48 of aftercooler 49. Aftercooler 49 is also provided with an air filter 50, and a tip driven fan air turbine arrangement of a rotatably mounted fan 52 with tip blades 53, of turbine 54. Fan 52 is driven by the rest of the inlet air applied to turbine 54 from lines 46 and 56 on blades 53, and serves to circulate cooling ambient air drawn through filter 50 about heat exchanger 48. After compressed inlet air passes through heat exchanger 48 it is conveyed by line 58 to a compressor 60 and then to an intercooler 61. Compressor 60 could be of the centrifugal type, and intercooler 61 can be the water radiator of engine 10. After cooling in intercooler 61 the cooled air is conveyed through turbine 64 which actuates compressor 60 through shaft 66 as the air expands and further cools before passing through line 30 to engine intake manifold 20.

In operation of the embodiment of FIG. 2, atmospheric air at, for example, 110° F and a pressure of 14.7 p.s.i.a. passes through air cleaner 36 and into engine compressor 14 where it is compressed and attains a temperature of about 484° F at a pressure of 55 p.s.i.a. The portion of inlet air which passes through heat exchanger 48 loses heat and its temperature drops to approximately 150° F at a pressure of 54 p.s.i.a. In compressor 60 the air is compressed to about 77 p.s.i.a. and the temperature rises to 357° F. After passing through intercooler 61 the air is cooled down to a temperature of 125° F and the pressure is about 76 p.s.i.a. After expanding through turbine 64 the air is conveyed by line 30 to intake manifold 20 of the engine 10 at a temperature of 32° F and a pressure of 31 p.s.i.a.

Figure 3:
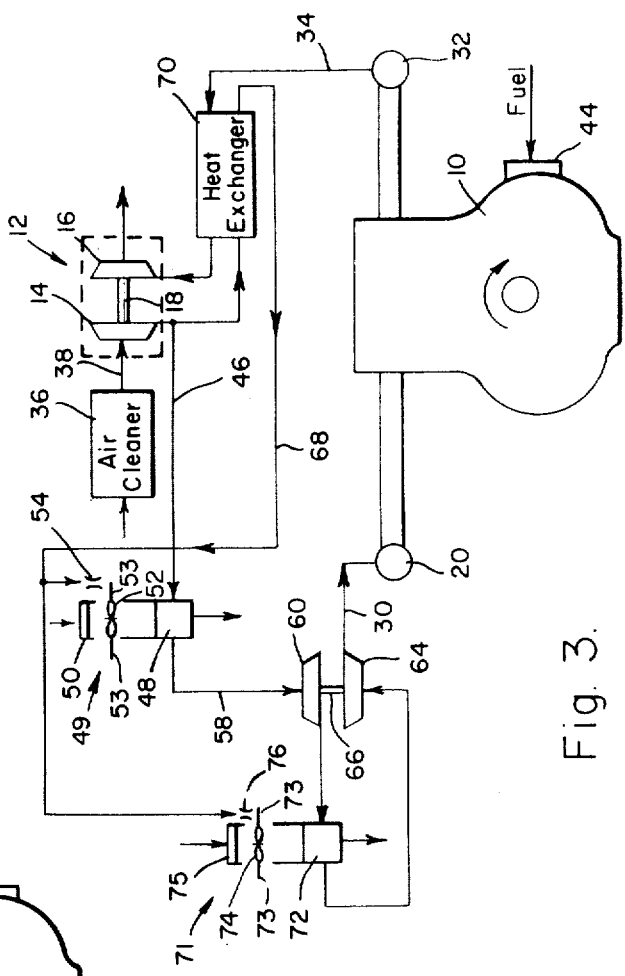
FIG. 3 is still another embodiment of the invention, schematically shown.

In the embodiment of FIG. 3, as before, a portion of the compressed inlet air from compressor 14 is conveyed through heat exchanger 48, but the rest of the air is diverted through a line 68 to an exhaust gas heat exchanger 70 positioned in line 34 where it acquires additional heat energy from hot engine exhaust gases on the way to the turbine 16. A part of the air, thus additionally heat energized, is utilized to drive fan 52 of turbine 54. After compression by the compressor 60, but before passing through the turbine 64, the air is additionally cooled by an intercooler 71. Intercooler 71 is similarly constructed as the aftercooler 49 and is provided with a heat exchanger 72, a fan 74 having blades 73 of a turbine 76, and air filter 75. Fan 74 is driven by the remainder of air additionally energized by heat exchanger 70 when applied through turbine 76, and serves to circulate cooling ambient air in heat exchanging relationship with the inlet air passing through heat exchanger 72. After cooling in heat exchanger 72 the air is passed through turbine 64 which actuates compressor 60 as the air expands and further cools on its way to intake manifold 20.

In operation, the temperatures and pressures found at various points of the embodiment of FIG. 3 are substantially the same as those of the embodiment of FIG. 2. Briefly, the ambient atmospheric inlet air is passed through air cleaner 36 at a temperature of 110° F and a pressure of 14.7 p.s.i.a. After compression by compressor 14 the temperature of the air rises to 484° F and the pressure is 55 p.s.i.a. After cooling in heat exchanger 48 the temperature of the air drops drown to 150° F and a pressure of 54 p.s.i.a. After compression by compressor 60 the air temperature becomes 357° F and the pressure about 77 p.s.i.a. When passed through the heat exchanger 72 the temperature drops to 125° F and the pressure becomes 76 p.s.i.a. Expansion through turbine 64 lowers the temperature of the air to 32° F at a pressure of 31 p.s.i.a.

Several modifications can be made to the embodiments of the present invention. For example, it will be appreciated that in FIG. 1 the turbine 28 could be optionally located in either line 22 or line 38. In FIG. 3 the heat exchanger 70 could be positioned to accept exhaust gases from turbine 16 instead of engine 10.

While specific embodiments of the invention have been illustrated and described, it is to be understood that they are provided by way of example only, and that various other modifications, alterations, and changes can be made without departing from the invention, and that the invention is not to be construed as being limited thereto, but only by the proper scope of the following claims.

What I claim is:

1. A turbocharging system for an internal combustion engine comprising:
    a turbocharger having a turbine driven by hot exhaust gases from said engine and a compressor on a common shaft with said turbine to compress charge air for said engine;
    heat exchanger means to receive compressed charge air from said turbocharger compressor to remove heat from the charge air;
    turbine fan means operably associated with said heat exchanger means to push a flow of ambient air across said heat exchanger means, said turbine fan means driven by a portion of the compressed charge air from said turbocharger compressor;
    compressor means to receive charge air from said heat exchanger means to further compress the charge air; and
    turbine means to receive compressed charge air from said compressor means to expand the charge air to a temperature below ambient temperature and to deliver the cooled compressed charge air to said engine, said turbine means on a common shaft with said compressor means to drive said compressor means.

2. The turbocharging system of claim 1 wherein the internal combustion engine is water cooled by a radiator, and the system additionally includes second heat exchanger means operably disposed in the internal combustion engine radiator to receive compressed charge air from said compressor means to cool the charge air and to deliver the charge air to said turbine means 3. The turbocharging system of claim 1 and in addition:
    second heat exchanger means operably disposed between said compressor means and said turbine means to receive compressed charge air from said compressor means to cool the charge air and to deliver the charge air to said turbine means;
    second turbine fan means operably associated with said second heat exchanger to push a flow of ambient air across said heat exchanger means, said turbine fan means driven by a portion of the compressed charge air from said turbocharger compressor; and
    third heat exchanger means operably associated with said turbocharger to receive hot exhaust gases from said engine to heat that portion of the compressed charge air from said turbocharger compressor which is utilized to drive said turbine fan means and said second turbine fan means.

4. A turbocharging system for a water cooled internal combustion engine comprising:
    a turbocharger including a turbine and a compressor on a common shaft, the turbine driven by exhaust gases from said engine to drive the compressor to compress charge air for said engine;
    first heat exchanger means to receive compressed charge air from said turbocharger compressor to remove heat from the charge air;
    tip turbine fan means operably associated with said first heat exchanger means to push a flow of ambient air across said first heat exchanger means, said tip turbine fan means driven by a portion of the compressed charge air from said turbocharger compressor;
    compressor means to receive charge air from said first heat exchanger means to further compress the charge air;
    second heat exchanger means operably disposed in the internal combustion engine water cooling radiator to receive compressed charge air from said compressor means to cool the charge air; and
    turbine means to receive charge air from said second heat exchanger means to expand the charge air to a temperature below ambient temperature and to deliver the cooled compressed charge air to said engine, said turbine means on a common shaft with said compressor means to drive said compressor means.

5. A turbocharging system for an internal combustion engine comprising:
    a turbocharger including a turbine and a compressor on a common shaft, the turbine driven by hot exhaust gases from said engine to drive the compressor to compress charge air for said engine;

first heat exchanger means to receive compressed charge air from said turbocharger compressor to remove heat from the charge air;

compressor means to receive charge air from said first heat exchanger means to further compress the charge air;

second heat exchanger means to receive compressed charge air from said compressor means to cool the charge air;

turbine means to receive compressed charge air from said second heat exchanger means to expand the charge air to a temperature below ambient temperature and to deliver the cooled compressed charge air to said engine, said turbine means on a common shaft with said compressor means to drive said compressor means;

third heat exchanger means operably associated with said turbocharger to receive hot exhaust gases from said engine to heat a portion of the compressed charge air from said turbocharger compressor;

first tip turbine fan means operably associated with said first heat exchanger means to push a flow of ambient air across said first heat exchanger means, said first tip turbine fan means driven by the heated compressed charge air from said third heat exchanger means; and second tip turbine fan means operably associated with said second heat exchanger to push a flow of ambient air across said second heat exchanger means, said second tip turbine fan means driven by the heated compressed charge air from said third heat exchanger means.

* * * * *